Patented June 9, 1936

2,043,249

UNITED STATES PATENT OFFICE 2,043,249

PLASTIC REFRACTORY INSULATING MATERIAL

Otis L. Jones, Joliet, Ill., assignor, by direct and mesne assignments, of one-half to Illinois Clay Products Company, Joliet, Ill., a corporation of Illinois, and one-half to F. E. Schundler & Company, Inc., Joliet, Ill., a corporation of Illinois No Drawing. Application August 9, 1933, Serial No. 684,393

5 Claims. (Cl. 106—10)

This invention relates to a plastic refractory insulating material and to a process for its production.

A number of attempts have been made to utilize exfoliated vermiculite in a heat insulating composition. Numerous formulas for compositions of this type have been proposed, but none of the ones so far suggested have had any great utility at very high temperatures. Particularly, a suitable bonding material has not been suggested which would bind the granules of exfoliated vermiculite together at high temperatures to produce a self-supporting, and at same time heat-resistant, composition.

I have now discovered that a high alumina hydraulic cement may be used very satisfactorily with vermiculite to provide a plastic refractory insulating material for use in making either monolithic linings or refractory shapes.

It is, therefore, an object of this invention to provide a plastic refractory insulating composition containing a high alumina hydraulic cement and exfoliated vermiculite.

It is a further object of this invention to provide a process for making such a composition.

Other and further objects of this invention will become evident from the following specification and the accompanying claims.

The greatest difficulty heretofore experienced in using vermiculite in a refractory heat resistant composition has been that no suitable bonding material was available. Many varieties of bonding agents have been used with exfoliated vermiculite when the composition was intended for use at ordinary temperatures, or at temperatures which were not sufficiently high to destroy the bonding agent, but none of these have been satisfactory at high temperatures.

I have overcome this difficulty by the use of a heat resisting cement of high alumina content such as that that known as "Luminite" cement. This product is produced in a manner similar to ordinary Portland cement except that bauxite is used to replace part or all of the clay or shale which is used in Portland cement. Unlike Portland cement, however, this product is very refractory and will take on a smooth, hard, vitreous surface when heated strongly. Chemically, it differs from ordinary Portland cement principally in that it has a high alumina content. Various cements high in alumina and of low lime content may be used and will be designated herein as hydraulic cements.

The various ingredients which go to make up my composition together with the ranges of each are as follows:

Formula 1

|  | Per cent |
|---|---|
| Exfoliated vermiculite | 50 to 70 |
| Calcined fire clay | 10 to 25 |
| Plastic fire clay | 5 to 15 |
| High alumina hydraulic cement | 15 to 35 |

Percents are based on the weight of the dry mix.

Vermiculite is a member of a group of minerals that includes jefferisite, biotite, and zonolite. These minerals all possess the property of exfoliating when heated to a high temperature. They appear to contain water in combination, which is released on heating, thereby causing the minerals to expand to many times their original volume. The expanded minerals contain numerous small pores or voids, and this is one of the reasons why they possess heat insulating qualities. When the term "exfoliated vermiculite" is used in this specification, it will be understood to include these equivalent exfoliated minerals.

Any of these minerals may be used in my composition but I prefer exfoliated vermiculite. After exfoliation, the vermiculite should be broken into granules which will pass through a 10 mesh screen but will remain on a 30 mesh screen.

While it is possible to use vermiculite, the particles of which are not within this size range, I have found that particles between 10 and 30 mesh (per inch) produce the most satisfactory results. When the exfoliated vermiculite is in particles of larger size, it tends to break down during the mixing process.

Fire clay is a bonding agent which may be used to give the mass the desired plasticity and spreadability. The fire clay has varying bonding strengths at varying temperatures.

While various types of fire clay may be used in my composition, I have found that plastic fire clay gives better results than flint fire clay.

Calcined fire clay may also be incorporated into my composition, if desired, in proportions up to 25% by weight. Calcined fire clay imparts structural strength to the mass.

The fineness of the calcined and plastic fire clays may be varied considerably, but I have found that the gradation of these materials as to size is very important. The following size ranges are very satisfactory for the calcined and plastic fire clays:

|  | Calcined | Plastic |
| --- | --- | --- |
|  | Percent | Percent |
| Proportion passing through 3/8" mesh screen | 100 | 100 |
| Proportion passing through 1/4" mesh screen | 70 | 100 |
| Proportion passing through 1/8" mesh screen | 30 | 100 |
| Proportion passing through 20 mesh screen | 20 | 90 |
| Proportion passing through 100 mesh screen | 10 | 50 |

The following formula illustrates the preferred narrower ranges for each of the above ingredients:

Per cent by weight
Exfoliated vermiculite _____ 50 to 60
Calcined clay _____ 15 to 20
Plastic fire clay _____ 5 to 10
High alumina hydraulic cement _____ 20 to 30

My product is extremely light when made up in accordance with my preferred formula as given above, weighing 50 lbs. or less per cubic foot. I attribute this lightness to the use of exfoliated vermiculite or other exfoliated mineral. Another distinct advantage of my composition is that it takes a hard permanent set which does not weaken at high temperatures. In fact, my cement can withstand temperatures up to 2700° F. without materially weakening or spalling. This property may be due in part to the fire clays present, but I attribute it principally to the high alumina (bauxite) hydraulic cement.

For some purposes, it is desired to make the composition as light as possible. This may be done by adding a small proportion of powdered charcoal. Up to 10% of charcoal having a fineness of 20 mesh or finer will be satisfactory. When the cement is heated, this charcoal burns out, leaving numerous small voids, which decrease the weight of the composition.

My composition may be prepared by mixing the dry pulverized ingredients in a suitable mill or other mixing device. However, the mill should not be of a type which exerts a rolling or crushing action, since this would compress the vermiculite into compact masses containing no pores or voids and thus destroy its most important property.

When the dry ingredients have been thoroughly mixed, a suitable amount of water should be added to produce a mix of the desired plasticity and spreadability. After thoroughly incorporating the water into the dry ingredients, the mix is ready for application. The application may be made either with a trowel, or cement gun or in any of the customary ways of applying cement, concrete and plaster. A smooth, monolithic layer may be produced which on firing acquires a hard, smooth vitreous surface which has very little tendency to spall or to shrink and crack on drying.

The ingredients of my plastic refractory insulating material are of such character as to cause the composition to set progressively as the drying and firing proceeds. The plastic fire clay imparts considerable green strength to the mix at the lower temperatures. By the time the mass reaches about 1000° F., the clay is dried out. At about 1800° F. the clay has set, thereby giving considerable strength to the mass at a temperature at which the high alumina content cement is weakest. The high alumina hydraulic cement, however, sets at about 2200° F. to give the mass additional strength at the higher temperatures. During the setting of the high alumina hydraulic cement a great amount of heat is generated and this aids in bringing the mass rapidly to a temperature such that the mass will vitrify and give a smooth, dense, glazed surface.

If it were not for the bonding property of the clay content at the lower temperatures, the mass would be liable to crumble and go to pieces. Also, if it were not for the presence of the high alumina hydraulic cement, the material would spall at the higher temperatures. Consequently, there is a cooperation effected as a result of the possession of these properties by the respective ingredients that results in an exceptionally useful material for plastic refractory insulation.

It will be understood that in place of "Lumnite" cement, other high alumina hydraulic setting cements, having desirable refractory properties, may be employed. For instance, I may replace up to about 50% of the "Lumnite" cement with a cement known commercially as "Matrix", which is also a high alumina content product. Its method of preparation is described in the Kraus Patent No. 1,747,551.

"Matrix" prevents deterioration of the plastic refractory insulating material because of its non-hygroscopic, colloidal character. It also prevents rehydration of the material after it has been fired and then allowed to stand cold for some time. The melting point of the cement is likewise raised by the addition of "Matrix".

I am aware that numerous details of the process may be varied through a wide range without departing from the principles of this invention, and I, therefore, do not purpose limiting the patent granted hereon otherwise than necessitated by the prior art.

I claim as my invention:

1. A plastic refractory insulating material capable when set of withstanding temperatures up to 2700° F. without materially weakening or spalling, comprising from 50 to 70% of exfoliated vermiculite, from 15 to 35% of high alumina hydraulic cement, from 5 to 15% of plastic fire clay, and from 10 to 25% of calcined fire clay.

2. A plastic refractory insulating material capable when set of withstanding temperatures up to 2700° F. without materially weakening or spalling comprising from 50 to 60% of exfoliated vermiculite, from 20 to 30% of high alumina hydraulic cement, from 5 to 10% of plastic fire clay and from 15 to 20% of calcined fire clay.

3. A refractory insulating material comprising in combination particles of exfoliated vermiculite constituting at least 50% of the material by weight, and clay and high alumina hydraulic cement which act progressively as binders as the material is raised to high temperatures, the clay functioning as a binder at about 1800° F. when the alumina cement is weakest and the latter reacquiring binding strength at about 2200° F.

4. A refractory insulating material comprising in combination particles of exfoliated vermiculite constituting at least 50% of the material by weight, charcoal not substantially exceeding 10% of the material by weight, and clay and high alumina hydraulic cement which act progressively as binders as the material is raised to high temperatures, the clay functioning as a binder at about 1800° F. when the alumina cement is weakest and the latter reacquiring binding strength at about 2200° F., the charcoal being adapted to burn out at high temperatures to leave numerous small voids in the material.

5. A refractory insulating material comprising in combination particles of exfoliated vermiculite constituting at least 50% of the material by weight, and about equal amounts of clay and high alumina hydraulic cement which act progressively as binders as the material is raised to high temperatures, the clay functioning as a binder at about 1800° F. when the alumina cement is weakest and the latter reacquiring binding strength at about 2200° F.

OTIS L. JONES.